Sept. 23, 1952   R. J. YODER   2,611,685
FLUID DISTRIBUTOR FOR VESSELS
Filed Nov. 22, 1950
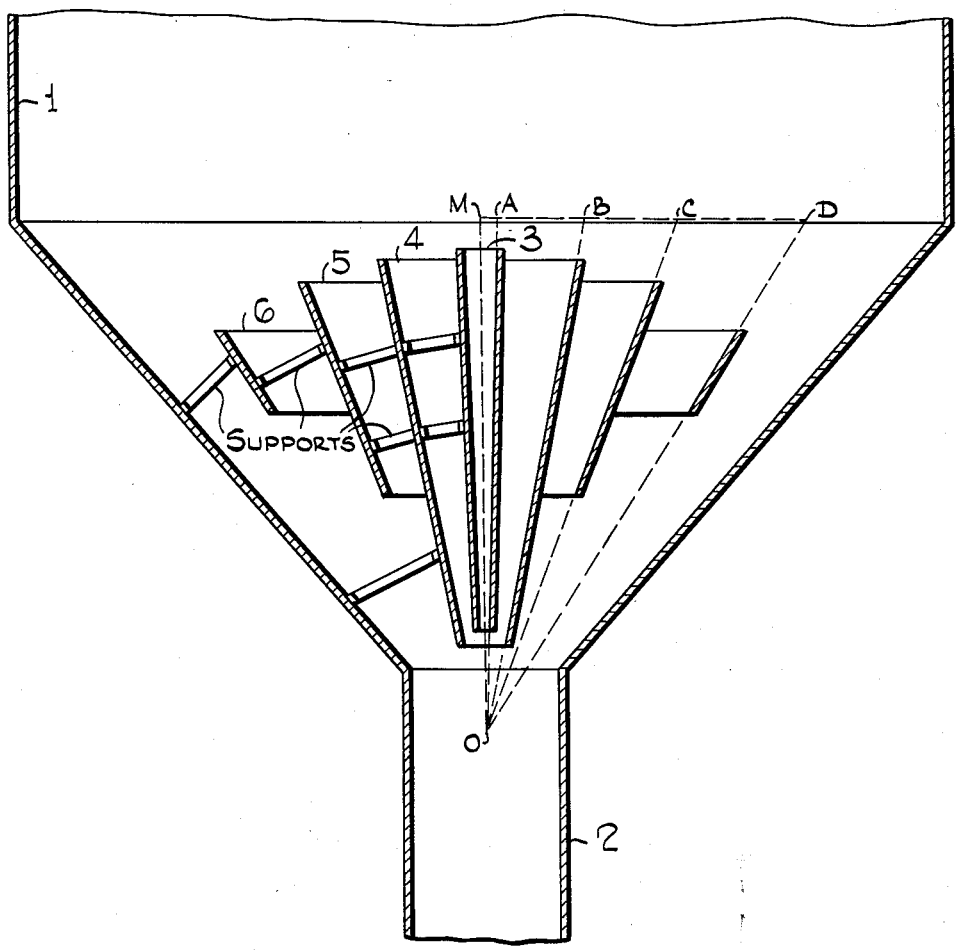
Richard J. Yoder  Inventor
By W. V. T Heilman  Attorney Patented Sept. 23, 1952

2,611,685

UNITED STATES PATENT OFFICE 2,611,685

FLUID DISTRIBUTOR FOR VESSELS

Richard J. Yoder, Elizabeth, N. J., assignor to Standard Oil Development Company, a corporation of Delaware Application November 22, 1950, Serial No. 197,125

4 Claims. (Cl. 23—288)

The present invention is concerned with an improved means for distributing fluids in reaction vessels. The invention is more particularly concerned with a method and apparatus for contacting vapors with fluidized, finely divided solid particles. In accordance with the present invention, a series of truncated concentric cones is arranged in the bottom of the reaction vessel in a manner that the dimensions of the annular spaces between the respective cones cause even distribution of the entering fluid into a relatively large cross-sectional vessel.

It is well known in the art to carry out various chemical reactions wherein it is very desirable to secure an even distribution of incoming fluid at the bottom of the vessel. This is particularly the case in a reaction wherein fluidized solid particles are contacted with vapors or gases. Various suggestions have been made and apparatus modifications adopted for securing satisfactory and efficient distribution of the incoming fluid. For example, various types of baffles, pierced plates and the like have been employed. However, in many operations it is very important to get extremely good distribution of the entering fluid over the cross-sectional area of a large vessel. Also, this even distribution must be effected with the greatest possible economy of space and pressure drop. For example, in a vessel containing fluidized solids, such as in a fluidized solids catalytic cracking operation, air and catalyst enter the comparatively large regenerator vessel (e. g. 20 ft. in diameter) through a comparatively small circular duct (e. g. 4 ft. in diameter) in the center of the bottom of the vessel. In order to secure the best fluidization of the bed with a minimum of catalyst carryover and a minimum of localized hot spots, the air entering the duct must be evenly distributed on expansion to the larger cross section of the vessel. Original installations of this type provided a cone gradually enlarging from the diameter of the inlet duct to the diameter of the vessel; however, erosion patterns in the vessel showed that the fluid did not distribute evenly across the vessel, but rather passed upwardly through the center of the vessel at a relatively high velocity, and downwardly along the outside edges of the vessel.

Recent installations, in addition to this enlarging cone, make use of a small inverted cone directly above the inlet duct. This cone serves to force the incoming fluid radially towards the outside edge of the vessel. However, it is evident that such a practice does not cause even distribution across the entire cross section of the vessel, but merely serves to effect higher-than-average velocities at the outside of the vessel (rather than in the center where they exist without the distributor cone), and lower-than-average velocities in the center of the vessel. This may be even less desirable than high velocities in the center of the vessel, since it is present practice to withdraw vapors from the outer portion of the regenerator shell by facing cyclone inlets radially towards the outside edge of the vessel. Thus, high velocities in this outside portion of the vessel greatly increase entrainment of catalyst in effluent gases.

The present invention consists of a distributor means comprising a series of concentric truncated cones, so arranged and of such dimensions that the frictional drop of the fluid in passing into a relatively large vessel of circular cross section from a duct of relatively small circular cross section, through the annular spaces between the cones, permits a predetermined proportion of air to pass through each annulus at a predetermined velocity (relative to the fluid passing through the other annular spaces of the distributor), the combination of fluid quantity and velocity resulting in a constant velocity of fluid flow in the direction of the axis of the large vessel.

The present invention may be readily understood by the drawing illustrating the embodiment of the same. Incoming fluids are introduced into the lower area of a reaction vessel 1 by means of a feed conduit 2. In accordance with the present invention, there is disposed in the bottom of vessel 1 a series of concentric truncated cones 3, 4, 5 and 6. The incoming fluid is distributed throughout the entire cross-sectional area of vessel 1 by means of these cones.

The truncated cones of the present invention are so arranged and are of such dimensions that the frictional drop of the fluid in passing from the relatively small cross-sectional conduit 2 to the relatively large cross-sectional area of 1 permits a predetermined proportion of air to flow in the direction of the axis of the larger vessel.

The invention generally comprises the positioning of a series of truncated cones within the conical bottom of a cylindrical treating zone. The truncated cones are so positioned that the apex of the cones projected and the apex of the conical bottom projected constitute a single point. The length of the truncated sections of the cones increases in the direction of the innermost cone. As the center of the vessel is approached, the respective cones extend to a higher point within the conical section of the vessel. Except for the innermost cone as the center of the vessel is approached, the length of the respective cones extends to a lower point within the conical section of the vessel, the base of each cone frustum is a fixed distance from the apex. For example, the angle of the center cone is set and the angles of the succeeding concentrically disposed cones increase at a constant increment which is equal to twice the angle of the center cone. Thus, if the angle of the center cone is set at X, the angles of the succeeding cones would be as follows:

Cone 1, X
Cone 2, 2X+X
Cone 3, 2X+3X
Cone 4, 2X+5X

The present invention may be readily appreciated by the following example illustrating one embodiment of the same example.

In a reaction vessel of circular cross section having a diameter of 20 ft. and with a circular inlet of 4 ft., and with a 45° enlarging conical bottom, the innermost cone frustum opened at an angle of 10°. The axis of this innermost cone corresponded to the axis of the vessel. Thus, the side of the innermost cone varied 5° from the axis of the vessel for a total opening of 10°: equivalent to X, as pointed out above. Fluid was passed through the reaction vessel at an upward velocity of one foot per second. The fluid pressure was 9 pounds per square inch gauge and the temperature about 1000° F.

Under these conditions, four concentrically disposed cone frusums were positioned in the conical bottom of the reaction vessel.

The length of the sides of the respective cones was determined as follows:

Referring to the drawing, from trigonometry it can be readily determined that the area of the circle MA is 2.38 sq. ft., ring AB is 20.2 sq. ft., and ring CD is 85.8 sq. ft. Hence, the proportions of air through the separate annular spaces which direct air to each of these ring areas is: NA:AB:CD::2.38:20.2:85.8. Furthermore, the air which passes through annulus CD takes almost a 45-degree turn from the inlet, while the air which passes through circle MA does not turn at all. Hence, the friction drop of 2.38 cu. ft./sec. of air passing through cone MA should be equal to the friction drop of 85.8 cu. ft./sec. passing through the annular space CD, plus the drop due to 85.8 cu. ft./sec. changing direction 45°.

The friction drops through ducts of this particular cross-sectional area are determined by the following well-known relations:

(1) Friction drop in pipe or annular spaces.

$$\frac{dF}{dL} = f\left(\frac{V^2}{g}\right)\left(\frac{1}{2m}\right)$$

(2) Fanning friction factor in terms of Reynolds number:

$$f = 0.046/(Re)^{0.2}$$

(3) Hydraulic radius in terms of diameters:

$$m = \frac{D_2 - D_1}{4} \text{ (approximate)}$$

(4) Reynolds number:

$$Re = \frac{4mV\rho}{\mu}$$

(5) Velocity in terms of volume rate of flow (Q) and diameters:

$$V = \frac{4Q}{(D_2^2 - D_1^2)} \text{ (approximate)}$$

It is further necessary to get diameters as a function of L, where L is the distance from center point O which the gas has travelled. This function is obtained trigonometrically, neglecting the thickness of the metal in comparison with the width of the annular space.

For AM, $$\frac{D_2}{2L} = \tan 5° \quad (D_1 = 0)$$

For AB, $$\frac{D_1}{2L} = \sin 5°$$

$$\frac{D_2}{2L} = \sin 15°$$

For CD, $$\frac{D_1}{2L} = \sin 25°$$

$$\frac{D_2}{2L} = \sin 35°$$

Combining the above, substituting, and integrating, the following is obtained:

For MA:

$$F = 5.16 \; Q^{1.8}\rho^{-0.2}\mu^{0.2}\left(\frac{1}{L_1 3.8} - \frac{1}{L_2 3.8}\right)$$

AB:

$$F = 0.0555 \; Q^{1.8}\rho^{-0.2}\mu^{0.2}\left(\frac{1}{L_1 3.8} - \frac{1}{L_2 3.8}\right)$$

CD:

$$F = 0.0121 \; Q^{1.8}\rho^{-0.2}\mu^{0.2}\left(\frac{1}{L_1 3.8} - \frac{1}{L_2 3.8}\right)$$

Here, F is total friction drop in ft., and $L_1$ and $L_2$ are the initial and final points on the cone frustum, measured in feet from point O. Q is the volume flow rate of the fluid in cu. ft./sec., and $\rho$ and $\mu$ are the density and viscosity of the fluid in lb./cu. ft. and lb./sec. ft.

For the example case, $L_2$ was taken arbitrarily as 9 ft., and for CD $L_1$ was taken as 6 ft. ($L_1 - L_2$ must be at least long enough to direct the air flow). Using the properties of the assumed air, F is calculated as 0.011 ft. for annulus CD, with 85.8 cu. ft./sec. passing through it. The value for F for annulus AB (with 20.2 cu. ft./sec. passing through it) should be 0.011 ft. plus the head due to the air's changing direction to enter annulus CD, minus the head due to the air's changing direction to enter annulus AB. This difference in head due to directional change was taken as 0.21 velocity heads for annulus CD and 0.05 velocity heads for annulus AB. The velocity at which the directional change took place was assumed 25 ft./sec. (the velocity of the air in the inlet duct).

Following the outlined procedure, $L_1$ was determined to be 1.3 ft. for annulus AB and 1.5 ft. for circle MA.

Once the distributor has been sized, it will continue to distribute the fluid evenly at different velocities from the design. If the fluid entering the vessel through the distributor is a mixture of gas and fluidized solid, the above method of determination may be used, substituting the properties of the fluid mixture for those of air.

The invention is broadly concerned with the use of a series of concentrically disposed cone frustums positioned in the conical bottom of a cylindrical reaction vessel. The distributing means of the present invention may be employed for distributing incoming fluids in any vessel of this character. It is particularly adapted for securing an improved operation in a fluidized solids technique.

The fluidized solids technique for processing feed fractions, as, for example, petroleum hydrocarbons and for carrying out other chemical reactions, is a conventional one. The system of a fluidized solids technique comprises a reaction zone and a regeneration zone, employed in conjunction with a fractionation zone. The reactor and the catalyst regenerator are arranged at approximately an even level. The operation of the reaction zone and the regeneration zone is conventional, which preferably is as follows:

An overflow pan is provided in the regeneration zone at the desired catalyst level. The catalyst overflows into a withdrawal line which preferably has the form of a U-shaped seal leg connecting the regeneration zone with the reaction zone. The feed stream introduced is usually preheated to a temperature in the range from about 500° to 650° F. in exchangers in heat exchange with regenerator flue gases which are removed overhead from the regeneration zone, or with cracked products. The heated feed stream is withdrawn from the exchangers and introduced into the reactor. The seal leg is usually sufficiently below the point of feed oil injection to prevent oil vapors from backing into the regenerator in case of normal surges. Since there is no restriction in the overflow line from the regenerator, satisfactory catalyst flow will occur as long as the catalyst level in the reactor is slightly below the catalyst level in the regenerator when vessels are carried at about the same pressure. Spent catalyst from the reactor flows through a second U-shaped seal leg from the bottom of the reactor into the bottom of the regenerator. The rate of catalyst flow is controlled by injecting some of the air into catalyst transfer line to the regenerator.

The pressure in the regenerator may be controlled at the desired level by a throttle valve in the overhead line from the regenerator. Thus, the pressure in the regenerator may be controlled at any desired level by a throttle valve which may be operated, if desired, by a differential pressure controller. If the pressure differential between the two vessels is maintained at a minimum, the seal legs will prevent gases from passing from one vessel into the other in the event that the catalyst flow in the legs should cease.

The reactor and the regenerator may be designed for high velocity operation involving linear superficial gas velocities of from about 2.5 to 4 feet per second. However, the superficial velocity of the upflowing gases may vary from about 1–5 and higher. Catalyst losses are minimized and substantially prevented in the reactor by the use of multiple stages of cyclone separators. The regeneration zone is provided with cyclone separators. These cyclone separators are usually from 2 to 3 and more stages.

Distributing means of the present invention are employed in the reaction and regeneration zones. Operating temperatures and pressures may vary appreciably depending upon the feed stocks being processed and upon the products desired. Operating temperatures are, for example, in the range from about 800° to 1000° F., preferably about 850°–950° F., in the reaction zone. Elevated pressures may be employed, but in general, pressures below 100 lbs. per sq. in. gauge are utilized. Pressures generally in the range from 1 to 30 lbs. per sq. in. gauge are preferred. A catalyst hold-up corresponding to a space velocity of 1 to 20 weights per hour of feed per weight of catalyst is utilized. A preferred ratio is 2 to 4. Catalyst to oil ratios of about 3 to 10, preferably about 6 to 8 by weight are used.

The catalytic material used both in the suspensoid operation and in the fluidized catalyst cracking operation, in accordance with the present invention, are conventional cracking catalysts. These catalysts are oxides of metals of groups II, III, IV and V of the periodic table. A preferred catalyst comprises silica-alumina wherein the weight per cent of the alumina is in the range from about 5 to 20%. Another preferred catalyst comprises silica-magnesium where the weight per cent of the magnesia is about 5% to 20%. These catalysts may also contain a third constituent, as for example, $ThO_2$, $WO_3$, $MoO$, $BeO$, $Bi_2O_3$, $CdO$, $UO_3$, $B_2O_3$, $SnO_2$, $Fe_2O_3$, $V_2O_5$, $MnO$, $Cr_2O_3$, $CaO$, $Tl_2O_3$, $MgO$ and $Ce_2O_3$ present in the concentration from 0.05% to 0.5%.

The size of the catalyst particles is usually below about 200 microns. Usually at least 50% of the catalyst has a micron size in the range from about 20–80. Under these conditions, with the superficial velocities as given, a fluidized bed is maintained wherein the lower section of the reactor, a dense catalyst phase exists while in the upper area of the reactor a dispersed phase exists.

Having described the invention, it is claimed:

1. In combination with a cylindrical reaction vessel, having an inverted cone-shaped bottom portion, and an inlet conduit opening into said portion, all having a common axis, an improved means for distributing flow into said vessel from said conduit by way of said bottom portion, comprising a concentric series of inverted, hollow, truncated cone elements disposed within said bottom portion coaxially with relation to each other and to said vessel, bottom portion and inlet conduit, and in circumferentially spaced relation to each other and to said bottom portion, wherein the projected apex of each of said elements is a single point, lying in said common axis, and wherein the larger base edge of each element in said series is equidistant from said single projected apex point.

2. An apparatus according to claim 1, in which the point constituting the projected apex of said cone-shaped bottom portion coincides with that of said cone elements.

3. An apparatus according to claim 1, in which the slant height of the cone elements in said series decreases progressively outwardly from the element next adjacent said innermost element.

4. An apparatus according to claim 1, in which the projected apex angle of each cone element outwardly from the innermost element is increased over that of the preceding element by twice the value of the projected apex angle of said innermost element.

RICHARD J. YODER.

REFERENCES CITED

The following references are of record in the file of this patent:

UNITED STATES PATENTS

| Number | Name | Date |
|---|---|---|
| 1,973,490 | Kurth et al. | Sept. 11, 1934 |
| 2,271,010 | Honerkamp | Jan. 27, 1942 |
| 2,316,541 | Ahlberg | Apr. 13, 1943 |
| 2,386,169 | Peery | Oct. 2, 1945 |
| 2,393,893 | Evans et al. | Jan. 29, 1946 |
| 2,421,212 | Medlin | May 27, 1947 |

FOREIGN PATENTS

| Number | Country | Date |
|---|---|---|
| 464,291 | Great Britain | Apr. 15, 1937 |